Dec. 15, 1959 B. R. CORSON 2,917,660

CATHODE RAY DEFLECTION SYSTEMS

Filed Jan. 29, 1959

WITNESSES

Edwin E. Bassler

James F. Young

INVENTOR

Bayard R. Corson

BY Charles F. Renz

ATTORNEY

United States Patent Office 2,917,660
Patented Dec. 15, 1959

2,917,660

CATHODE RAY DEFLECTION SYSTEMS

Bayard R. Corson, Allendale, N.J., assignor to Westinghouse Electric Corporation, East Pittsburgh, Pa., a corporation of Pennsylvania Application January 29, 1959, Serial No. 789,921
6 Claims. (Cl. 315—27)

The present invention relates to cathode ray beam deflection circuits, and more particularly relates to cathode ray beam deflection circuits of the type in which an electron scanning beam is required to be deflected in a substantially linear manner with respect to time during a portion of each deflection cycle.

Cathode ray tube deflection systems of the magnetic deflection type, as now used in television systems, for example, normally require relatively large amounts of power in order to obtain full deflection of the scanning beam. This is true in spite of the fact that an ideal cathode ray beam deflection system consumes virtually no power, and even a practical deflection circuit should theoretically dissipate only a small fraction of the energy circulated in the system. Accordingly, there is recoverable energy circulating in most such systems.

It has been customary to introduce damper means into such deflection circuits in order to dissipate the energy that is stored therein during the retrace, or flyback portion of each deflection cycle. Such damper means normally comprise a diode coupled across a portion of the flyback transformer or across the deflection yoke windings for the cathode ray tube. In some such systems the energy removed from the deflection circuit may be reclaimed and utilized to increase the output of the B+ power source or to reduce the required voltage output of such source while maintaining the same deflection waveform or amplitude. By the use of such a system, wherein the damper diode functions as an efficiency diode, the power efficiency of the cathode ray beam deflection system may be raised to a considerable degree.

The damper diode in such systems serves to reduce the undesirable oscillatory transients in the damping waveform as applied to the electromagnetic deflection yoke of the cathode ray tube. In most applications of thermionic diode type damping devices the supply of heater energy to the cathode becomes somewhat of a problem inasmuch as the cathode of the thermionic diode may be subjected to alternating voltage pulse components of several thousand volts or so. In television receivers as well as in other applications it is ordinary and economical practice to connect the damper tube heater element in a series string with the heater elements of a plurality of other discharge devices so that the series connected heaters may be operated from a conventional 110 volt alternating current source. When the damper tube heater element is so arranged it necessarily must operate at substantially ground potential insofar as deflection voltage pulse components are concerned.

Present day deflection circuits generally use autotransformer arrangements for coupling the deflection signal generator or driver to the electromagnetic deflection yoke. Such circuits generally require that the cathode of the damper tube be connected so that it is subjected to flyback voltage pulses of several thousand volts in amplitude. If the damper tube heater were to be permitted to operate at the same voltage as that of the cathode, a separate filament transformer insulated to withstand the pulse voltage magnitudes would be required between the damper tube filament and the source of filament heating current. Obviously, the provision of such a special filament transformer would be unjustifiably expensive. Accordingly, it has become the practice in the television industry to utilize damper tubes in which the cathode sleeve is insulated from the internally located heater element by a ceramic sleeve or other insulating means. Such insulation of the cathode relative to the heater increases the cost of such damper tubes and deteriorates performance in that the warm-up time necessary for the damper tube cathode to reach operating temperature is increased.

It is accordingly an object of the present invention to provide a novel and effective structure and circuit arrangement for the efficiency or damper diode in deflection wave generating systems which structure and circuit arrangement enables the supply of heater energy at substantially ground potential insofar as deflection wave voltage components are concerned.

It is a further object of the present invention to provide a novel and improved circuit arrangement for cathode ray beam deflection systems in which heater power may be more simply and economically applied to a damping tube which has high voltage pulse amplitudes or pulse components present on its cathode electrode.

It is an additional object of the present invention to provide a novel deflection circuit employing a thermionic tube type of damper means such that the heater current for the damper tube may be conveniently supplied from a series string of tube filaments and such that the damper tube cathode may be subjected to high voltage deflection wave components.

It is a different object of the present invention to provide a high efficiency beam deflection system in which the damper diode is provided with means for distributing the voltages appearing between its cathode and the adjacent heating element.

It is a general object of the present invention to provide an inexpensive and more reliable electromagnetic cathode ray deflection circuit.

These and other objects of this invention will be apparent from the following description taken in accordance with the accompanying drawing, throughout which like reference characters indicate like parts, which drawing forms a part of this application and in which.

Figure 1:
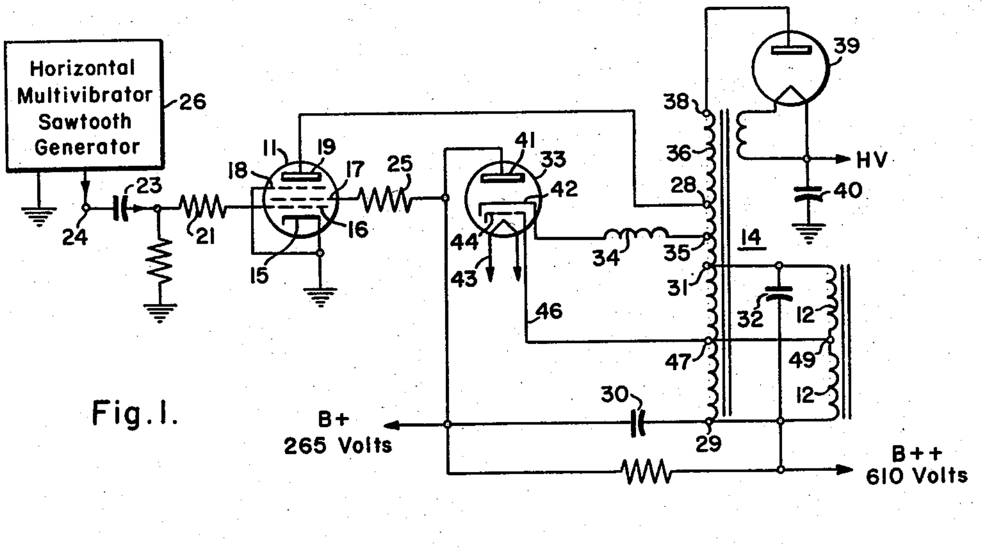
Figure 1 is a schematic circuit diagram of a deflection system in accordance with the present invention.

Referring now to Fig. 1 there is shown an electron discharge device 11 which functions as an output power amplifier to provide cyclically varying currents to the deflection coil 12 through winding 13 of flyback transformer 14. The electron discharge device comprises a cathode 15, grid or control electrode 16, a screen grid 17, a suppressor grid 18 and an anode 19. The cathode 15 is connected to ground. The control electrode 16 is connected through a parasitic suppression resistor 21 and a grid leak resistor 22 to ground and also through resistor 21 and capacitor 23 to the input terminal 24. The screen grid is connected through a voltage dropping resistor 25 to the positive terminal B+ of a conventional direct current voltage source. Suppressor grid 18 is connected to cathode 15, and anode 19 is connected to a first terminal 28 of the transformer primary winding 13. A second or low end terminal 29 of transformer 14 is connected through bypass capacitor 30 to the positive terminal B+. Deflection coils 12 are connected across a portion of the primary winding 13 between terminal 29 and a first intermediate terminal 31. A padding capacitor 32 is shunted across the deflection coils 12.

Energizing voltage is applied to the anode 19 from the B+ source by means of a circuit connection from the positive terminal B+ to the anode of a unilaterally conducting device 33, the cathode of which is connected through a choke 34 to a tap 35 of primary winding 13. In accordance with conventional practice, an additional winding portion 36 is connected at one end to the upper end terminal 28 of winding 13, the other end terminal 38 of winding portion 36 being connected through a unilaterally conducting device or high voltage rectifier 39 and a storage capacitor 40 to ground. High voltage for operation of a cathode ray tube may be provided by a connection (not shown) extending from the cathode of rectifier 39 to the second anode of the cathode ray tube. Alternating voltage appearing between terminals 29 and 38 of the transformer 14 is rectified by the rectifier device 39 and appears as a high potential across capacitor 40.

Unilaterally conducting device 33, as shown in Fig. 1, taken together with radio frequency choke 34 and capacitor 30, constitutes a damping means connected between the terminals 29 and 35 of the flyback transformer 14. The lowermost end terminal 29 of the flyback transformer operates at the boosted B potential or B++ as impressed across capacitor 30 by the efficiency diode 33. Accordingly, it is seen that the cathode 42 of damper tube 33 is subject to deflection wave pulse components corresponding to the magnitude of such pulse components developed in the portion of the transformer winding between the terminals 29 and 35. The heater element 43 of damper tube 33 may be connected, in accordance with conventional practice, in series or in parallel with a plurality of other discharge device filaments to a conventional source of filament heating alternating current (not shown). Accordingly, the heater element 43 is operated at substantially ground potential insofar as deflection wave pulse components are concerned. Between the heater element 43 and the cathode 42 is provided an electrostatic shielding member 44 which will be described in greater detail hereinafter. The shielding member 44 is connected by way of a conductor 46 to an intermediate terminal 47 of the flyback transformer which terminal 47 is preferably located at a point on the transformer such that the alternating voltages appearing at terminal 47 with respect to terminal 49 are approximately equal in magnitude to one-half the voltage appearing at terminal 35. Alternately the shielding element 44 may be connected by means of a conductor 46 to any of various resistance or capacitance or inductance voltage divider networks which would be connected between the terminals 35 and 29. The arrangement as shown in Fig. 1 is believed preferable at present since the intermediate terminal 47 is normally provided for connection to the midpoint 49 of the cathode ray deflection yoke windings. Thus, connection of shielding element 44 to the intermediate terminal 47 involves no expense and does not require the provision of a special terminal on the deflection transformer. In arrangements where such an intermediate terminal is not readily provided, voltage divider arrangements as heretofore mentioned may be utilized.

Figure 2:
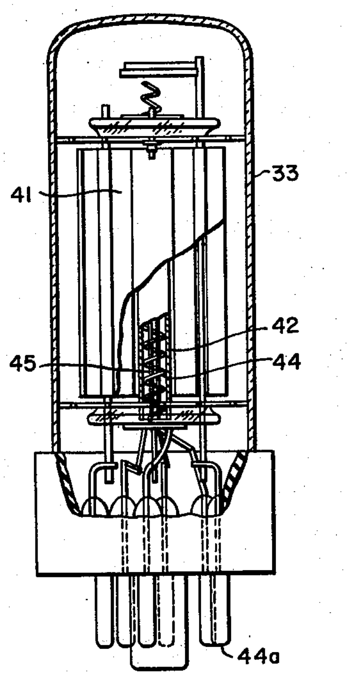
Fig. 2 illustrates a side view, partially cut away of an improved damper discharge device which finds application in the deflection circuit of the present invention.

Now referring to Fig. 2 of the drawing there is shown a discharge device 33 which is provided with an electrostatic shielding member 44 as shown in the schematic drawing of Fig. 1. The discharge device 33 includes the usual evacuated envelope enclosing an anode 41 of cylindrical form. A cathode sleeve 42 is located within the anode and a filament or heater element 45, corresponding to element 43 of Fig. 1, extends lengthwise within the cathode sleeve. Surrounding the heater element 45 within the cathode sleeve there is provided a helical metallic shielding member 44 which is insulated from the cathode sleeve 42 and is likewise insulated from the heater element 45. In a preferred embodiment the helical shielding member 44 is formed of electrically conductive material and is coated with a ceramic or other temperature resistant electrical insulating material so that the shielding member serves to space the heater element 45 from the inner walls of the cathode sleeve 42 and at the same time provides a conductive electrostatic shield which will divide or distribute any potential differences existing between the heater element and the cathode sleeve. Such division of the electrostatic stress applied between the heater and cathode enables the ceramic insulating material to withstand greater peak voltages without requiring greater thickness of insulating material. In addition, the provision of the electrostatic shield divides the distributed capacitance of the heater cathode assembly into two serially connected capacitances so that the capacitance between the heater and cathode is reduced. Dividing the insulation into a plurality of layers or systems of insulation by means of a conductive shield provides substantial enhancement in the total dielectric strength of the heater-to-cathode insulation. Helical shielding member 44 is electrically connected at its lower end to an external pin 44*a* of the discharge device. Pin 44*a* may be connected by a conductor 46 as shown in Fig. 1 to a point of intermediate potential to accomplish the above-mentioned division of electrostatic stress.

Referring now to the operation of the circuit of Fig. 1, sawtooth voltage from generator 26 is applied to terminal 24. As the voltage at the control electrode 16 increases a current of increasing amplitude is caused to flow through the transformer winding 13 producing a flow of current in the deflection coils 12. When the current through the deflection coils 12 and the winding 13 reaches a maximum, the energy stored in the magnetic field surrounding the deflection coils 12 and the winding 13 is at a maximum. At this time, the voltage applied to input terminal 24 is driven negative very rapidly and discharge device 11 is rendered nonconductive. The result of the sudden termination of current flow from anode 19 through winding 13 is to cause the magnetic field surrounding the winding 13 and the deflection coils 12 to suddenly collapse. The collapsing field initiates oscillation of high frequency in the equivalent tuned circuit consisting of the deflection coils 12, the transformer winding 13 and the distributed, reflected, stray and fixed capacities of the deflection circuit. The combination of elements tends to oscillate at the resonant frequency of the equivalent tuned circuit.

The current through the deflection coils 12 reverses during the first quarter cycle of such oscillation and rises to a maximum in the reverse direction at the end of the second quarter cycle of the oscillation. The rapid rate of change of current through the deflection coil 12 initiated by sudden cutoff of discharge device 11, constitutes the flyback or retrace period of the scansion.

During the retrace period a large amplitude voltage pulse is developed in transformer 14 and is applied in the positive sense to anode 19. A positive going high voltage pulse of similar form but of lesser magnitude is applied to cathode 42 of damper tube 33 and constitutes a severe electrostatic stress between the heater element 43 and cathode 42.

During the aforementioned first half cycle of oscillation, the energy in the deflection circuit flows out of the magnetic fields into the circuit capacitances and back into the magnetic fields with some loss because of inherent resistances of the circuit components. At or near the end of the first half cycle of oscillation the potential applied to the cathode 42 of unilaterally conductive device 33, as a result of attempted continuation of the oscillation, is such as to cause device 33 to conduct and the low forward impedance of this damper tube 33 results in a damping out of subsequent oscillations in the winding 13 and the coils 12.

Following the end of one half cycle oscillation, the energy stored in the magnetic fields of the deflection coils and winding 13 causes current to flow through the deflection coils 12, transformer winding 13 and damper tube 33. Discharge device 11 begins conduction slightly before the middle of the scanning trace to produce further deflection of the beam and subsequent repetition of the above-described cycle of operation.

While the present invention has been shown in one form only, it will be obvious to those skilled in the art that it is not so limited but is susceptible of various changes and modifications without departing from the spirit and scope thereof.

I claim as my invention:

1. In a combination, electromagnetic deflection means for providing a recurrent magnetic field to deflect cathode rays, a deflection wave transformer coupled to apply a repetitive and substantially linearly increasing current wave to said deflection means, said transformer including a winding having at least first and second terminals and an intermediate terminal, amplifier means coupled to said transformer for applying a sawtooth waveform current to said winding and for abruptly terminating said current at predetermined times for a predetermined interval approximately corresponding to one-half the resonant period of said transformer whereby transient oscillations tend to occur in said transformer and deflection means, damper valve means including anode and cathode electrodes and heater means with said anode and cathode being coupled to said first and second terminals for unilaterally conducting during a predetermined interval to dissipate the reactive energy stored in said transformer by said sawtooth waveform current, and electrostatic shield means positioned between said cathode electrode and said heater means and coupled to said intermediate terminal of the transformer so as to dynamically assume potentials intermediate the absolute potentials of said cathode and said heater means.

2. In a cathode ray beam deflection system a flyback transformer including an inductive winding having at least first, second and third terminals with said third terminal being located intermediately of said first and second terminals on said winding, means for cyclically passing a nonsinusoidal waveform current through said winding and for interrupting said current during predetermined intervals whereby said transformer tends to oscillate thereby producing high induced potentials between said first and second terminals; damper valve means including anode and cathode electrodes connected respectively to said first and second terminals, a heater element disposed adjacent said cathode and connected to a point of relatively low potential, and an electrostatic shield disposed between said heater and said cathode electrode and electrically connected to said intermediate terminal so as to dynamically distribute the high potentials appearing between said heater and said cathode.

3. A deflection circuit for cathode rays comprising; a transformer including a winding having first and second terminals and an intermediate terminal, a cathode ray deflection indicator coupled in shunt with a portion of said first winding, circuit means including a source of cyclically varying current coupled to said winding for passing a sawtooth current wave through at least a portion of said winding and for periodically causing said varying current to be periodically cut off so that the current in said transformer is set into oscillation, means including a discharge device coupled to said transformer for damping said oscillation, said discharge device including cathode and heater elements and an electrostatic shielding element disposed therebetween, and circuit means connecting said intermediate terminal to said electrostatic shielding element so that voltages induced in said winding by said oscillation and applied between said cathode and heater element are accompanied by voltages of similar waveform and lesser amplitude applied between said heater element and said shield.

4. A deflection circuit for a cathode ray comprising a source of cyclically varying current, a damper discharge device having cathode, anode, and heater elements with an electrostatic shielding element being disposed between said heater element and said cathode, a transformer including a winding connected to said source, a cathode ray deflection coil connected in shunt with a portion of said winding so that current through said coil increases to a predetermined value in accordance with increase in current from said source, said source including means for interrupting the supply of current to said winding after the current through said coil rises to a predetermined value whereby the current in said deflection coil circuit after rising to a value corresponding to said predetermined value is set into oscillation at a frequency determined by the total reactance of the deflection coil circuit so that said current decreases in said deflection coil and flows in the reverse direction, said damper discharge device being coupled to said transformer for damping said current oscillations after the first half cycle of said oscillations whereby the current through said coil may be caused to uniformly decrease substantially unaffected by said oscillations after said fiirst half cycle of oscillation, and circuit means coupling said winding with said electrostatic shield so that pulse potentials of substantially similar waveform and different magnitudes are simultaneously applied to said cathode and said shielding element.

5. A scanning-signal generator system comprising: an amplifier having an input circuit to which a signal of scanning waveform is applied and an output circuit; means in said output circuit for developing a magnetic scanning field and a relatively high voltage of pulse waveform; damping means including a thermionic diode coupled to said last-mentioned means to damp out transient oscillations tending to occur therein; said diode including anode, cathode and heater elements with said heater element being connected to a low voltage heating current supply circuit, and said cathode being coupled to said inductive means so that said relatively high voltage of pulse waveform appears between said cathode and said heater element; an electrostatic shielding element disposed between and insulated from said cathode and heater elements; and circuit means coupling said shielding element to said inductive means so that a fractional portion of said relatively high voltage is applied between said shielding element and said heater element.

6. In a cathode ray deflection system in which a power output amplifier is adapted to deliver cyclically varying current through a coupling transformer to an electromagnetic beam deflection means associated with a cathode ray tube wherein an electron beam is deflected by the passage of current through said deflection means; the combination of: damping means, including a thermionic discharge device, provided in shunt with at least a portion of said coupling transformer for damping out oscillations which would normally be produced during a portion of each current cycle; said discharge device including anode, cathode and heater elements and an electrostatic shielding member disposed between said cathode and said heater elements; said heater element being connected to a source of low voltage heating energy so as to operate at substantially a reference potential insofar as deflection wave pulse components are concerned; the connection of said damping means with said coupling transformer being such that high voltage deflection wave components are applied to said cathode relative to said heater element; and circuit means connecting said electrostatic shielding element with said coupling transformer for applying high voltage deflection wave components of similar waveform and substantially smaller amplitude to said shielding element.

No references cited.